(12) United States Patent
Misso et al.

(10) Patent No.: US 6,324,034 B1
(45) Date of Patent: Nov. 27, 2001

(54) SPACER/STOP ASSEMBLY AND DISC DRIVE WITH SPACER/STOP ASSEMBLY

(75) Inventors: Nigel F. Misso, Bethany; Steve S. Eckerd, Oklahoma City; Roy L. Wood, Yukon; John D. Stricklin, Oklahoma City, all of OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/474,241

(22) Filed: Dec. 29, 1999

Related U.S. Application Data

(60) Provisional application No. 60/140,858, filed on Jun. 24, 1999.

(51) Int. Cl.$^7$ ........................................... G11B 5/55
(52) U.S. Cl. ........................................... 360/265.1
(58) Field of Search ............................ 360/265.1, 265.2

(56) References Cited

U.S. PATENT DOCUMENTS

| | | |
|---|---|---|
| 4,949,206 | 8/1990 | Phillips et al. . |
| 5,109,310 | 4/1992 | Ohkjita et al. . |
| 5,262,913 | 11/1993 | Stram et al. . |
| 5,477,401 | 12/1995 | Squires et al. . |
| 5,715,119 | 2/1998 | Williams et al. . |
| 5,745,325 | 4/1998 | Matsumoto . |
| 5,844,754 | 12/1998 | Stefansky et al. . |
| 5,864,447 | 1/1999 | Matsumoto et al. . |
| 5,864,449 | 1/1999 | Dominguez et al. . |
| 5,875,073 | 2/1999 | Andrews et al. . |
| 5,905,606 | 5/1999 | Johnson et al. . |

*Primary Examiner*—Allen Cao
(74) *Attorney, Agent, or Firm*—Teodore M. Magee; Westman, Champlin & Kelly, P.A.

(57) ABSTRACT

A stop and a disc drive with a stop are provided that limit rotation of a rotary actuator, which moves laterally between an upper magnet bonded to an upper plate and a lower magnet bonded to a lower plate. The stop includes a spacer core that has an upper portion for contacting the upper plate, a lower portion for contacting the lower plate, and a middle portion having a recessed surface. A stop sleeve is press fit to an upper press-fit surface on the upper portion and a lower press-fit surface on the lower portion. The stop sleeve and the recessed surface together define a deflection space.

16 Claims, 5 Drawing Sheets

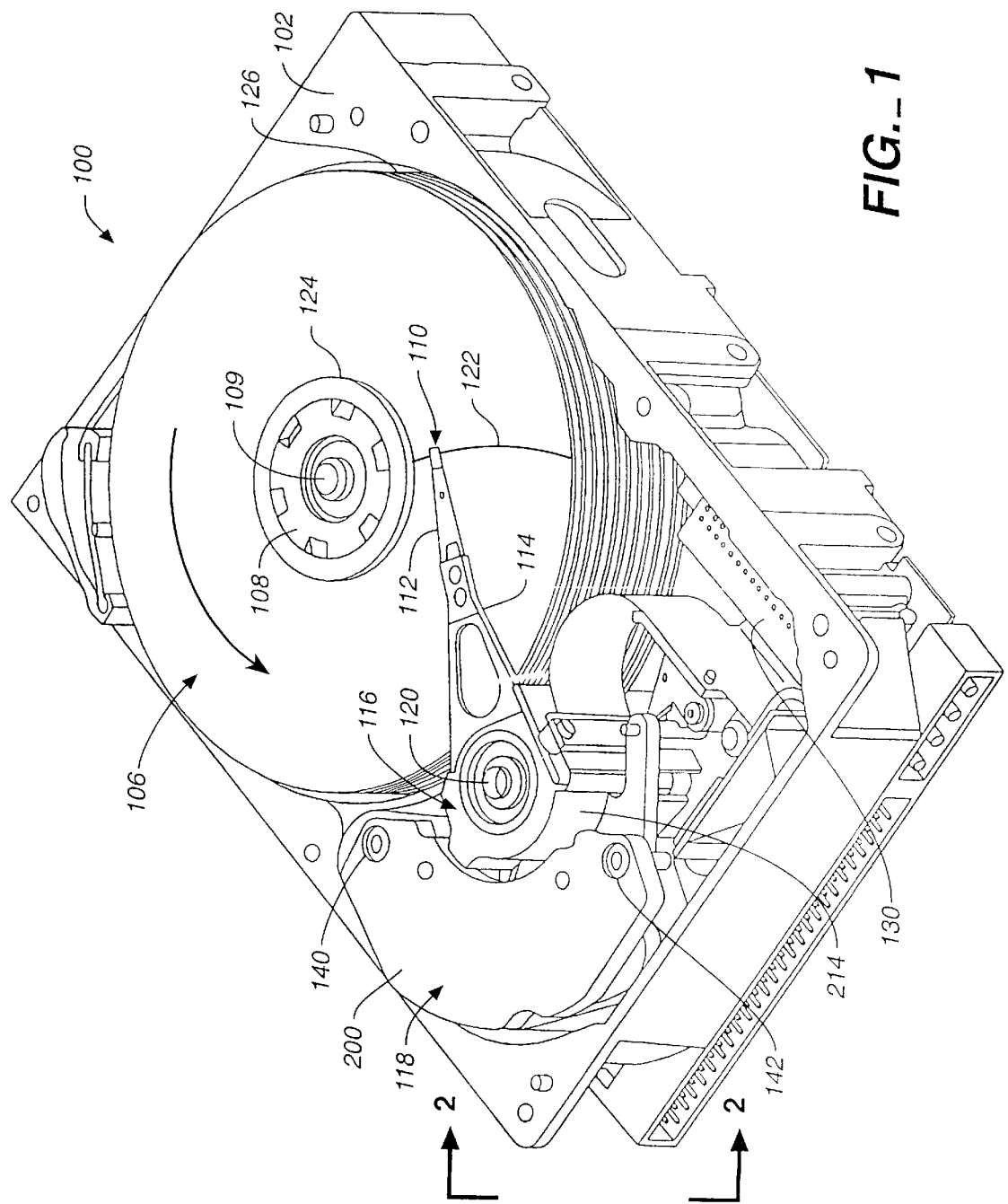
FIG._1

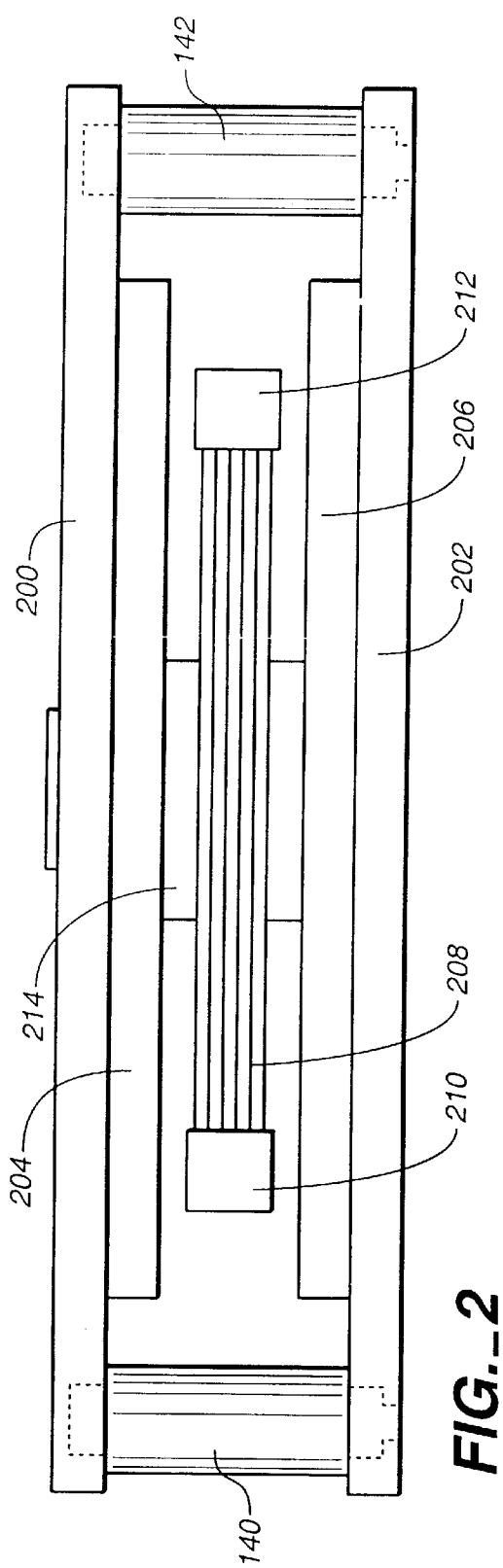
FIG._2
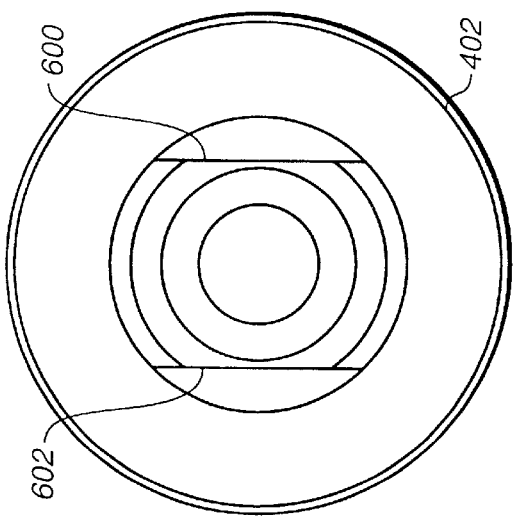
FIG._6

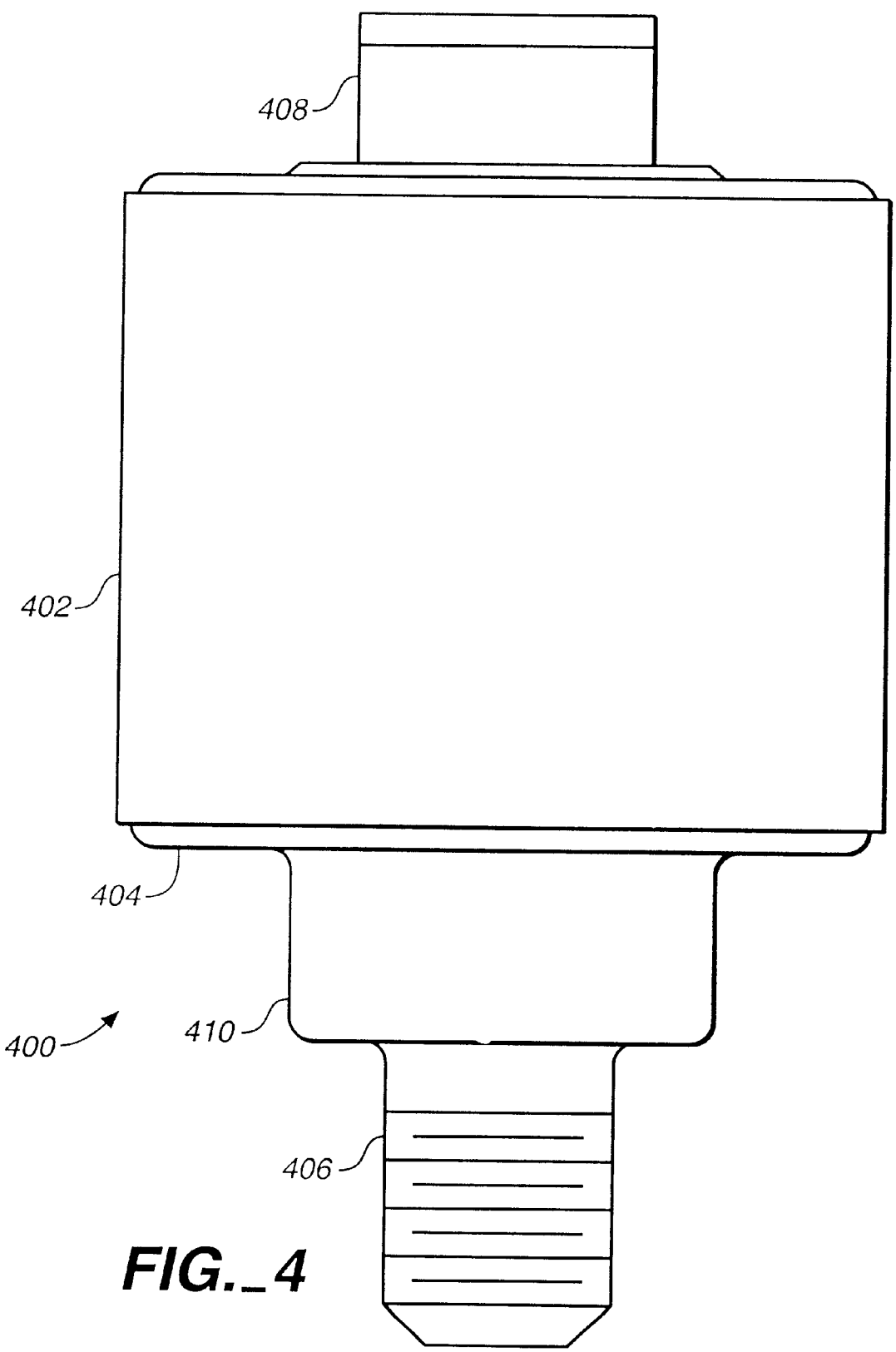
FIG._4

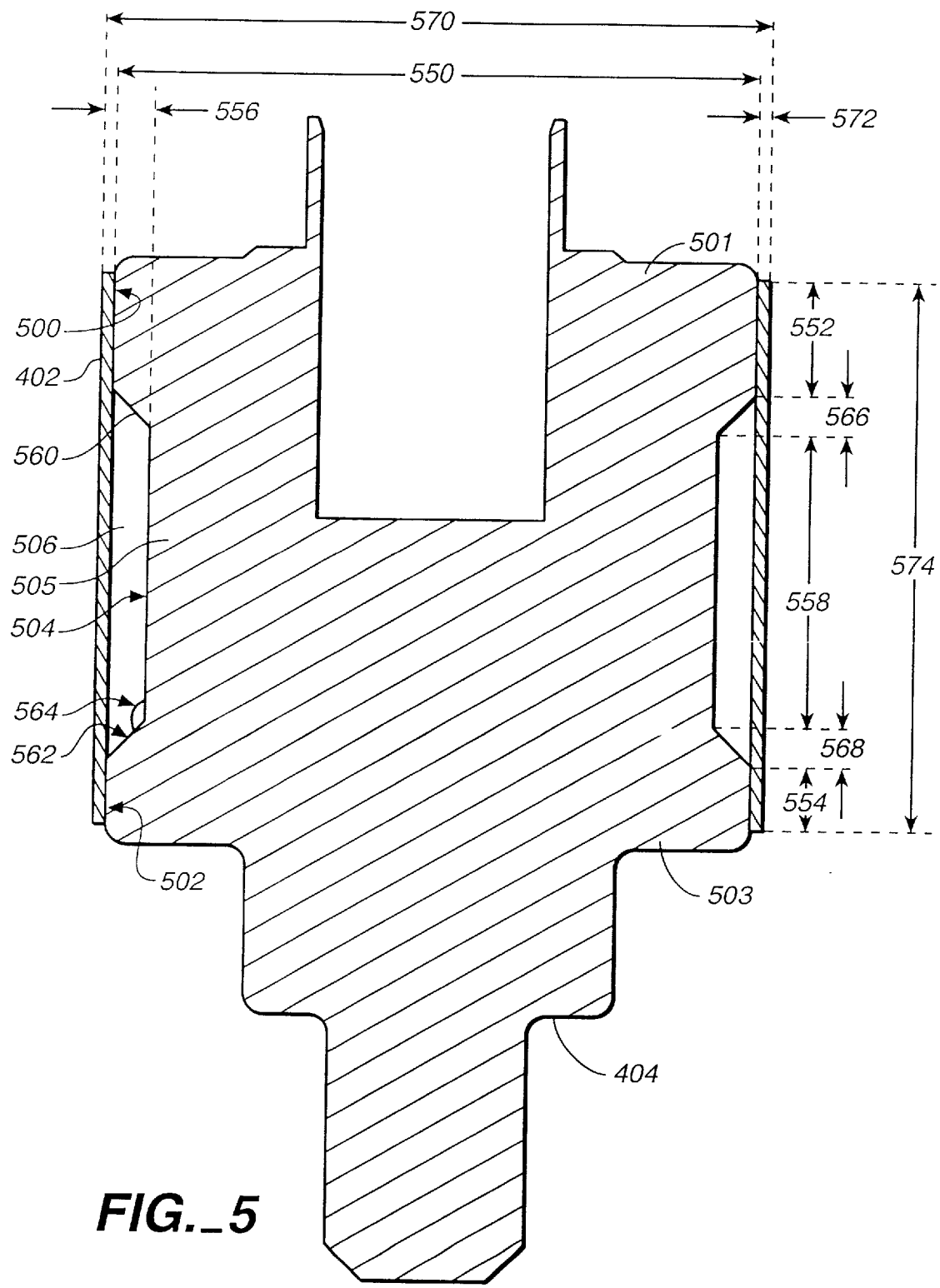
FIG._5

SPACER/STOP ASSEMBLY AND DISC DRIVE WITH SPACER/STOP ASSEMBLY

REFERENCE TO RELATED APPLICATIONS

The present application claims priority from a U.S. Provisional Patent Application having Ser. No. 60/140,858 filed on Jun. 24, 1999 and entitled STOP/SPACER ASSEMBLY.

FIELD OF THE INVENTION

The present invention is related to disc drives. In particular, the present invention is related to stop mechanisms and voice coil motor assemblies in disc drives.

BACKGROUND OF THE INVENTION

In a computer disc drive, data is stored on a computer disc in concentric tracks. Before reading or writing data to the tracks, the disc drive must position a head over a desired track. In disc drives with rotary actuators, this involves rotating an actuator arm that supports one or more heads at the end of one or more suspension assemblies. The actuator arm is typically rotated about a pivot point using a voice coil motor.

The voice coil motor includes a wound electrical conductor that is connected to the actuator arm, and two magnets that are positioned on opposite sides of the wound conductor. The magnets are separated from the wound conductor and each other by a spacer. When a current passes through the wound conductor, the current interacts with the magnetic fields produced by the magnets thereby causing the wound conductor to move laterally between the magnets. This causes the actuator arm to pivot around the pivot point so that the position of the head changes.

The heads can also move in response to physical forces applied to the outside of the disc drive. If these forces are large enough, they can cause the head to swing wildly in the drive. To prevent damage to the head during these events, stops are in the disc drive to keep the head from moving past the outer edge of the disc and to keep the head from striking a central hub of the disc. In some disc drives, these stops are placed on the spacers that separate the magnets of the voice coil motor.

To minimize damage to the heads, the stops must limit the deceleration experienced by the heads. In addition, the stops should not cause the actuator arm to bounce a significant distance. Under the prior art, these attributes were attained using an elastomeric material such as rubber or urethane that encircles a steel core of the spacer. In some prior art devices, the elastomeric material is surrounded by a spring material such as a thin sheet of steel or plastic.

Although elastomeric materials provide good energy absorption, they are difficult to make with accurate dimensional control and geometric precision. In particular, the dimensions of these materials are highly temperature dependent. Furthermore, the mechanical properties of these material, such as stiffness and dampening, vary significantly with temperature. In addition, these materials tend to outgas thereby contaminating the interior of the disc drive. As such, a stop/spacer is needed that does not require an elastomeric material.

SUMMARY OF THE INVENTION

A stop and a disc drive with a stop are provided that limit rotation of a rotary actuator, which moves laterally between an upper magnet bonded to an upper plate and a lower magnet bonded to a lower plate. The stop includes a spacer core that has an upper portion for contacting the upper plate, a lower portion for contacting the lower plate, and a middle portion having a recessed surface. A stop sleeve is press fit to an upper press-fit surface on the upper portion and a lower press-fit surface on the lower portion. The stop sleeve and the recessed surface together define a deflection space.

BRIEF DESCRIPTION OF THE DRAWINGS

FIG. 1 is a perspective view of a disc drive in which aspects of the present invention may be practiced.

FIG. 2 is a back view of a voice coil motor of the present invention.

FIG. 4 is a side view of a stop/spacer of the present invention.

FIG. 5 is a cross-sectional side view of a stop/spacer of the present invention.

FIG. 6 is a top view of a stop/spacer of the present invention.

DETAILED DESCRIPTION

Figure 3:
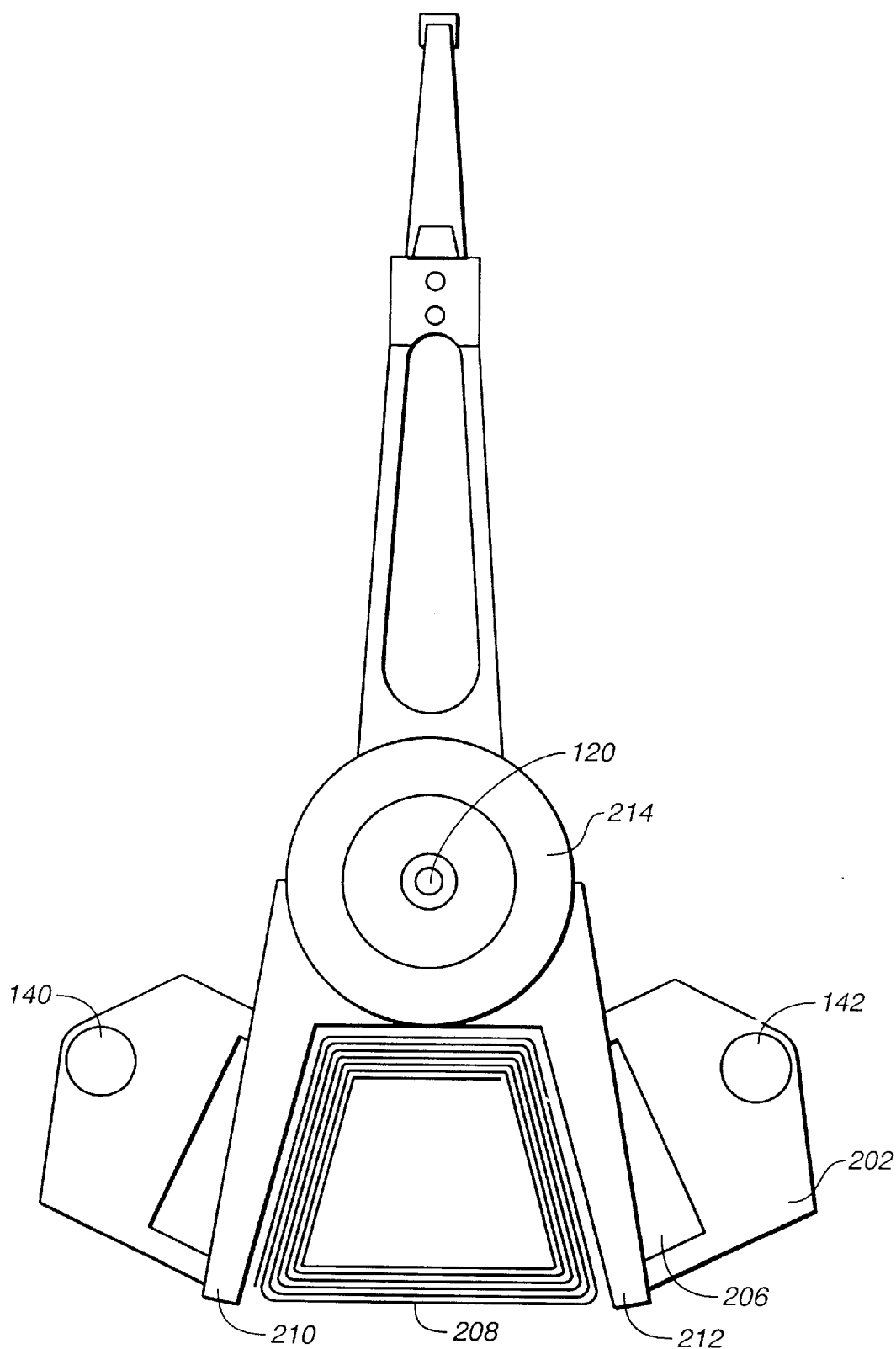
FIG. 3 is a top view of a voice coil motor and actuator with a top plate removed.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. Actuator 116 is driven by a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

FIG. 2 provides a back view of voice coil motor 118 from the point of view of site lines 2 in FIG. 1. Voice coil motor 118 includes a top plate 200 and a bottom plate 202 that are respectively bonded to a top magnet 204 and a bottom magnet 206. A coiled conductor 208 is bonded between voice coil arms 210 and 212, which extend from a central hub 214 of actuator 116. When a current is passed through coiled conductor 208, the current interacts with the magnetic fields produced by top magnet 204 and bottom magnet 206 causing the coil to move laterally between top magnet 204 and bottom magnet 206.

To prevent the heads from striking disc clamp 108 or from moving past outer diameter 126 of FIG. 1, voice coil motor 118 includes stops 140 and 142. Stops 140 and 142 also act as spacers that separate top magnet 204 from bottom magnet 206 to provide a space for coiled conductor 208.

FIG. 3 provides a top view of voice coil motor 118 and actuator 116 with top plate 200 and top magnet 204 removed. From FIG. 3, it is apparent that voice coil arms 210 and 212 will strike stops 140 and 142 if actuator 116 is rotated to either respective extreme.

FIG. 4 is a side view of a stop 400 of the present invention in isolation. Stop 400 includes a stop sleeve 402 that is press fit to a spacer core 404. Spacer core 404 includes a bottom screw portion 406 that is inserted through a hole in bottom plate 202 of FIG. 2 and screwed into base 102 of FIG. 1. A bottom slip-fit portion 410 is machined to fit tightly within the hole in bottom plate 202. A top portion 408 of stop 400 includes two opposing parallel surfaces that are designed to accept a wrench used to screw stop 400 into base 102. Top portion 408 fits within a hole in top plate 200.

FIG. 5 provides a cross-sectional side view of stop 400. In FIG. 5, it can be seen that stop sleeve 402 is press fit to a top cylindrical surface 500 of an upper portion 501 and a bottom cylindrical surface 502 of a lower portion 503 of spacer 404. Between top cylindrical surface 500 and bottom cylindrical surface 502, spacer 400 includes a middle portion 505 with a relieved or recessed cylindrical surface 504. Since cylindrical surface 504 is recessed, the radius of middle portion 505 is smaller than the radii of top portion 501 and bottom portion 503. Together, stop sleeve 402 and relieved cylindrical surface 504 define an a recess or gap 506 that provides a deflection space into which stop sleeve 402 may be deflected during impact with the actuator. By providing an empty space beneath the stop sleeve, the present invention provides a stop that has desirable elastic properties without requiring elastomeric materials.

In most embodiments, spacer 404 is a ferromagnetic material that is able to conduct magnetic flux. For example, in some embodiments, spacer 404 is constructed of a 400 series stainless steel. In other embodiments it is constructed of a nickel-plated low carbon steel. Those skilled in the art will recognize that these materials are being provided as examples and materials with similar strength and magnetic properties may be used instead.

In many embodiments, sleeve 402 is constructed of a material with a high strength to modulus ratio. Preferably, the material can be formed into a thin sleeve so that it has a relatively low flex modulus (i.e. between 320 and 380 thousand pounds per square inch). In most embodiments, sleeve 402 is formed through stamping, injection molding, or extrusion to avoid the creation of a seam along the sleeve. In addition, preferred materials for sleeve 402 have mechanical properties with low temperature dependence. In particular, the material should be strong enough to hold a press fit over the spacers at temperatures between –40° and 165° F. In some embodiments, the sleeve was formed of a polyphenylsulfone (PPSF) such as RADEL® R-5100 from British Petroleum/Amoco. Under other embodiments a polycarbonate, such as Lexan® from General Electric, was used as the stop sleeve material. In other embodiments, titanium alloys, such as Ti 6Al 4V and Ti 3Al 2.5V are used. These materials are only provided as examples, and materials with similar mechanical properties as described may be used in their place within the scope of this invention.

In the embodiment of FIG. 5, top portion 501 has a diameter 550 of about 0.3405 inches (0.86 cm) and top cylindrical surface 500 has a height 552 of about 0.027 inches (0.07 cm). Similarly button portion 503 has a diameter 550 of about 0.3495 inches (0.89 cm) and bottom cylindrical surface 502 has a height of about 0.027 inches (0.07 cm). Recessed cylindrical surface 504 is recessed a distance 556 of about 0.0227 inches (0.06 cm) and has a height 558 of about 0.2245 inches (0.57 cm). The recess is formed by two tapered recess surfaces 560 and 562 that are at an angle 564 of 135° to the recessed cylindrical surface 504. The recess surfaces 560 and 562 have projected heights 566 and 568 of about 0.0227 inches (0.06 cm).

Sleeve 402 of the embodiment of FIG. 5 has an outer diameter 570 of about 0.374 inches (0.95 cm) and a thickness 572 of about 0.0143 inches (0.04 cm). The height 574 of sleeve 402 is about 0.324 inches(0.82 cm).

Those skilled in the art will recognize that the dimensions given above are by way of example only and that the present invention may be practiced with other dimensions.

FIG. 6 is a top view of stop 400, showing opposing flat surfaces 600 and 602, which are designed to be engaged by a wrench to screw stop 400 into base 102. Sleeve 402 is shown around the outer perimeter of stop 400.

In summary, a stop 400 limits rotation of a rotary actuator 116 that moves between an upper magnet 204 bonded to an upper plate 200 and a lower magnet 206 bonded to a lower plate 202. The stop includes a spacer core 404 that has an upper portion 501 contacting the upper plate 200, a lower portion 503 contacting the lower plate 202, and a middle portion 505 having a recessed surface 504. A stop sleeve 402 engages the spacer core 404 to define a deflection space 506.

A disc drive 100 is also provided that includes a head 110 attached to an actuator 116. A voice coil motor 118 moves actuator 116 and includes an upper magnet 204 bonded to an upper plate 200, a lower magnet 206 bonded to a lower plate 202, and a coiled conductor 208 coupled to actuator 116. An actuator stop 400, 140, 142 spaces the upper plate 200 from the lower plate 202 and limits the range of motion of actuator 116. Actuator stop 400, 140, 142 includes a spacer 404 positioned between the upper plate 200 and the lower plate 202 and having a recessed portion 505. Actuator stop 400, 140, 142 also includes a sleeve 402 extending over the recessed portion 505 such that a deflection space 506 is defined between the recessed portion 505 and the sleeve 402.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, the recessed portion may be defined by orthogonal rather than slanted surfaces without departing from the scope and spirit of the present invention. Other modifications can also be made.

What is claimed is:

1. A stop for limiting rotation of a rotary actuator moving laterally between an upper magnet bonded to an upper plate and a lower magnet bonded to a lower plate, the stop comprising:
   a spacer core for spacing the upper plate from the lower plate, the spacer core comprising:
      an upper portion for contacting the upper plate;
      a lower portion for contacting the lower plate; and
      a middle portion between the upper portion and the lower portion, the middle portion having a surface that is recessed relative to the upper portion and lower portion;
   a stop sleeve, contacting the upper potion and lower portion and defining a deflection space adjacent to the recessed surface.

2. The stop of claim 1 wherein the upper portion, the lower portion, and the middle portion are each cylindrical.

3. The stop of claim 1 wherein the spacer core comprises a ferromagnetic material.

4. The stop of claim 3 wherein the spacer core comprises stainless steel.

5. The stop of claim 1 wherein the stop sleeve comprises a sleeve less than about 0.5 mm thick.

6. The stop of claim 5 wherein the stop sleeve comprises a polyphenylsulfone.

7. The stop of claim 1 wherein the stop sleeve is press fit to the upper portion and the lower portion of the spacer core.

8. A disc drive for retrieving information from a disc, the disc drive comprising:
   a head for reading information from the disc;
   an actuator supporting the head and capable of moving the head over the disc;
   a voice coil motor for moving the actuator, the voice coil motor having an upper magnet bonded to an upper plate, a lower magnet bonded to a lower plate, and a coiled conductor bonded to the actuator; and
   an actuator stop for spacing the upper plate from the lower plate and for limiting the range of motion of the actuator, the actuator stop comprising:
      a spacer positioned between the upper plate and the lower plate and having a recessed portion;
      a sleeve extending over the recessed portion; and
      a deflection space defined between the recessed portion and the sleeve.

9. The disc drive of claim 8 wherein the spacer further comprises an upper bonding portion above the recessed portion and a lower bonding portion below the recessed portion.

10. The disc drive of claim 9 wherein the sleeve is bonded to the upper bonding portion and the lower bonding portion.

11. The disc drive of claim 10 wherein the sleeve is press bonded to the upper bonding portion and the lower bonding portion.

12. The disc drive of claim 10 wherein the upper bonding portion and the lower bonding portion are cylindrical.

13. The disc drive of claim 12 wherein the recessed portion is cylindrical.

14. The disc drive of claim 8 wherein the spacer comprises a ferromagnetic material.

15. The disc drive of claim 15 wherein the sleeve comprises a polyphenylsulfone material.

16. A disc drive for storing information on a disc, the disc drive comprising:
   a voice coil motor and actuator assembly coupled to a head and capable of moving the head over a surface of the disc; and
   stop means for limiting the rotation of the actuator, the stop means positioned in the voice coil motor.

* * * * *